Figure 1:
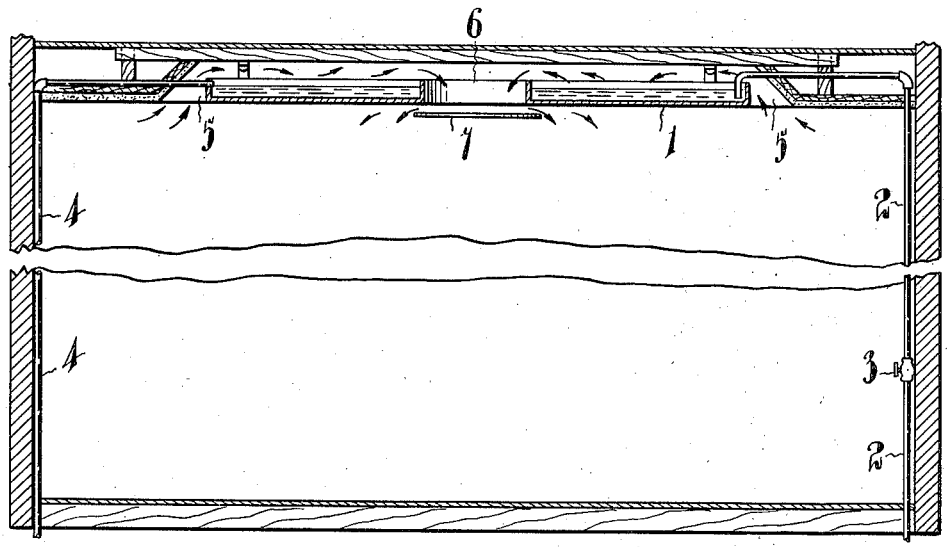

Jan. 5, 1937.   R. RUTLEDGE   2,066,540
APPARATUS FOR FRESHENING AIR IN DWELLING ROOMS OR OTHER CHAMBERS
Filed July 26, 1934

Inventor
R. Rutledge
by J. Edw. Maybee
ATTY

Patented Jan. 5, 1937

2,066,540

UNITED STATES PATENT OFFICE 2,066,540

APPARATUS FOR FRESHENING AIR IN DWELLING ROOMS OR OTHER CHAMBERS

Robert Rutledge, Toronto, Ontario, Canada

Application July 26, 1934, Serial No. 737,019

5 Claims. (Cl. 261—119)

This application relates in part to subject matter disclosed in application Serial No. 646,581 filed December 10th, 1932.

The invention is based on the discovery that still or unagitated fresh water will absorb from unagitated foul air any contaminating gases contained therein, so that by bringing the foul air in a chamber into contact with the surface of a body of such water the air will be kept pure provided the water be renewed as rapidly as may be necessary to maintain its power to absorb foul gases or other odoriferous impurities.

It is also based on the fact that cool water will remove surplus foul moisture from over-humid foul air and will supply moisture to over-dry air and that air which passes over the water will become heavier either by cooling or loss of foul moisture or both.

The invention consists therefore in maintaining a body of fresh and still but constantly renewed water in a chamber, preferably near the ceiling, and in arranging that by natural convection the air will flow quietly over the water and thence down into the chamber.

The water will usually be at a lower temperature than the air.

In a typical case the water is supplied at a temperature of 50° F. Assuming the temperature of the lower part of the chamber to be 72° F., the temperature of the ceiling will probably be in the neighborhood of 80° F.

If the hot air is over-humid its humidity will be removed by the cool, still water over which it flows. The air will also be more or less cooled by its contact with the water. The result of the decrease in humidity and temperature is that the air becomes heavier and drops to the lower part of the chamber, displacing warm moist air to flow up in turn over the water pan.

While foul air is passing over the water it gives up to the water all gaseous and vaporous impurities and reacquires its natural freshness.

If the hot air passing up to the water is deficient in humidity it will pick up water vapor from the water and thus its specific gravity is decreased, but, as the water will be maintained at a lower temperature than the air, the latter will be cooled sufficiently to increase its specific gravity to any extent great enough to overcome the decrease caused by the increase of humidity, and circulation is thus maintained.

In any event whatever may be the temperature of the water circulation will take place as long as contact with the water increases the specific gravity of the foul air.

The features of importance in my invention are that substantially pure water is employed, that is the water should contain no other soluble impurities than are contained in good drinking water; that the water be "still", that is not in a disturbed or finely divided state; that the air in the chamber be caused to flow over the water; that the water be located adjacent the top of the chamber; and that the air passing over the water during its passage has its specific gravity increased sufficiently to allow it to drop through the hot foul air.

The invention is utilized by apparatus illustrated in the accompanying drawing in which—

Figure 4:
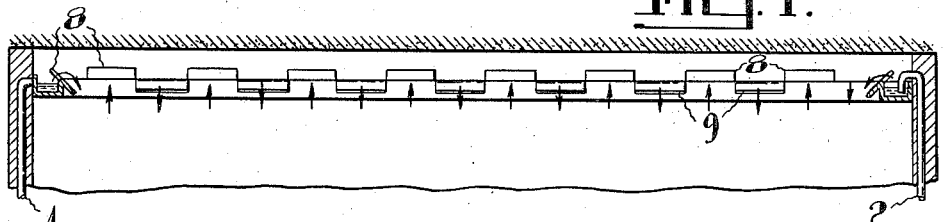
Figure 2:
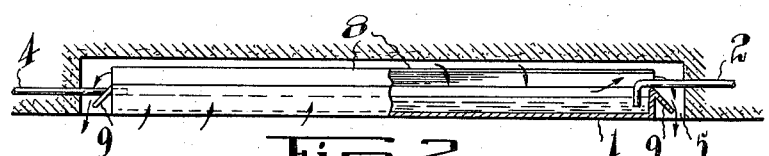
Figure 3:
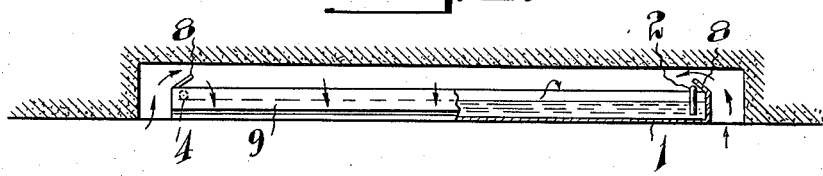

Fig. 1 is a diagrammatic vertical section showing a chamber equipped with the apparatus;

Fig. 2 a cross section showing part of the top of a chamber equipped with a modified form of the invention;

Fig. 3 a similar view showing a section of the pan taken at right angles to Fig. 2; and Fig. 4 a view similar to Fig. 1 showing a water trough extending around the sides of the room at the ceiling.

In the drawing like numerals of reference indicate corresponding parts in the different figures.

Referring to Fig. 1, 1 is a water pan suitably supported from the ceiling of the chamber. To this pan runs a water supply pipe 2 provided with a control valve 3 and from it runs the overflow pipe 4. A constant water level may thus be maintained in the pan and a constant change of water at a rate dependent on the setting of the valve 3. The temperature of the water may also be regulated by varying the rate of supply.

To effect a flow of air to and from the water surface, I provide channels 5, which may be formed in the ceiling and which lead rising air over the rim of the pan.

The pan is annular in form and air passing over its surface may flow down through the central opening 6. This opening may be provided with a baffle 7 to decrease the tendency of hot air in the room to pass up through the opening.

The parts described may be readily fitted into the decorative scheme of the ceiling.

Another arrangement is shown in Figs. 2 and 3. Parts of the rim of the pan, which latter is shown as rectangular, are provided with upwardly and inwardly inclined baffles 8 and other parts with downwardly and outwardly inclined baffles 9. The rising foul air will pass in over the baffles 8 and the purified air will pass out over the baffles 9, as the baffles 9 tend to check a reverse flow.

In Fig. 4 I show a water trough extending along one or more walls of a room near the ceiling. The rim of the trough is shown as provided with baffles 8 and 9 to better separate ascending from descending air.

It will be apparent, of course, that many other arrangements are possible for facilitating the circulation which would fall within the scope of my invention, whether using temperature differences or mechanical action.

The advantages of this invention are: firstly, objectionable odors are removed from the air in the chamber; secondly, the air is corrected as to its humidity; thirdly, the air is more or less cooled, which cooling is regulable by varying the rate of water flow. To put it briefly the air is restored to the condition of natural fresh outdoor air.

What I claim as my invention is:

1. The combination with a chamber of a pan positioned in the chamber adjacent the top thereof and adapted to contain a shallow body of still water of extended surface area; means for maintaining a supply of fresh water in the pan; means for directing rising foul air inwardly over the rim of the pan, escape means for purified air being provided over another portion of the rim of the pan; and a baffle tending to check back passage of foul air through the escape means.

2. The combination with a chamber of a rectangular pan positioned in the chamber adjacent the top thereof and adapted to contain a shallow body of still water of extended surface area; means for maintaining a supply of fresh water in the pan; inwardly and upwardly directed flanges on the rim of the pan at two opposite sides; and downwardly and outwardly directed flanges on the rim of the fan at the remaining two opposite sides.

3. The combination with a chamber having a recess formed in its ceiling of a pan substantially entirely contained in the recess with its sides spaced from the sides of the recess to provide a passage for air; means for maintaining a supply of fresh water in the pan; and means for directing rising foul air inwardly over the rim of the pan, while leaving the surface of the water unobstructed, escape means for purified air being provided over another portion of the rim of the pan.

4. Air freshening apparatus according to claim 1 in which the water pan is of annular form, the central opening of the pan forming the escape means.

5. Air freshening apparatus according to claim 1 in which the rim of the pan is provided with flanges alternately inclined upwardly and downwardly, the upwardly inclined flanges serving to direct rising foul air inwardly over the rim of the pan while the downwardly inclined flanges form baffles to prevent back flow of escaping air.

ROBERT RUTLEDGE.